(12) United States Patent
Inoue (10) Patent No.: US 10,481,621 B2
(45) Date of Patent: Nov. 19, 2019

(54) AIR PRESSURE CONTROL DEVICE AND ADJUSTMENT VALVE

(71) Applicant: AZBIL CORPORATION, Chiyoda-ku (JP)

(72) Inventor: Kazuhisa Inoue, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/954,854

(22) Filed: Apr. 17, 2018

(65) Prior Publication Data

US 2018/0299910 A1   Oct. 18, 2018

(30) Foreign Application Priority Data

Apr. 18, 2017   (JP) .................................. 2017-081882

(51) Int. Cl.
*G05D 16/06*   (2006.01)
(52) U.S. Cl.
CPC ..... *G05D 16/0636* (2013.01); *G05D 16/0663* (2013.01); *G05D 16/0669* (2013.01); *Y10T 137/7794* (2015.04)
(58) Field of Classification Search
CPC ........... G05D 16/0636; G05D 16/0663; G05D 16/0669; Y10T 137/7794
USPC .................................................... 137/505.11
See application file for complete search history.

(56) References Cited

U.S. PATENT DOCUMENTS

| | | | | |
|---|---|---|---|---|
| 1,595,809 | A | * | 8/1926 | Nichols ................... B60S 5/043 137/116.5 |
| 1,657,740 | A | * | 1/1928 | Carrey .................. F25B 41/062 137/505.3 |
| 1,691,758 | A | * | 11/1928 | Fausek ............... G05D 16/0663 137/329.02 |

(Continued)

FOREIGN PATENT DOCUMENTS

| | | |
|---|---|---|
| CN | 201322111 Y | 10/2009 |
| CN | 105987208 A | 10/2016 |

(Continued)

OTHER PUBLICATIONS

Korean Office Action dated May 16, 2019 in Patent Application No. 10-2018-0043883 (with English translation), 7 pages.

(Continued)

*Primary Examiner* — William M McCalister
(74) *Attorney, Agent, or Firm* — Oblon, McClelland, Maier & Neustadt, L.L.P.

(57) ABSTRACT

An air pressure control device includes first and second housings, a diaphragm partitioning an inner space of the housings into a first air chamber (one air chamber) and a second air chamber (the other air chamber), a valve seat supported by the diaphragm, a valve member arranged in the first air chamber and closing or opening a through-hole in the valve seat, a pressure adjusting mechanism (including a pressure adjusting bolt and an upper seat) that adjusts a force applied to the diaphragm from a side including the second air chamber, and a main spring (compression coil spring) disposed in the second air chamber and applying a spring force to a lower seat (spring receiving member) disposed on the valve seat. A bearing is interposed between the valve seat and the lower seat.

5 Claims, 6 Drawing Sheets

(56) References Cited

U.S. PATENT DOCUMENTS

| | | | | | |
|---|---|---|---|---|---|
| 1,786,110 | A | * | 12/1930 | Gunn | F25B 3/00 137/505 |
| 2,313,564 | A | * | 3/1943 | Manly | G05D 16/10 137/116.5 |
| 2,357,318 | A | * | 9/1944 | Donaldson | G05D 16/0663 137/505.11 |
| 2,739,611 | A | * | 3/1956 | Cornelius | F16K 17/168 137/116.5 |
| 2,753,887 | A | * | 7/1956 | Meincke | G05D 16/0655 137/505.11 |
| 2,789,574 | A | * | 4/1957 | Tucker | G05D 16/0663 137/116.5 |
| 2,878,830 | A | * | 3/1959 | Wiedmann | F24D 19/1006 137/505.11 |
| 2,879,783 | A | * | 3/1959 | Taplin | G05D 16/0672 137/116.5 |
| 3,204,657 | A | * | 9/1965 | Boyd | G05D 16/0663 137/116.5 |
| 3,420,257 | A | * | 1/1969 | Lansky | G05D 16/0663 137/116.5 |
| 3,463,183 | A | * | 8/1969 | Wallace | G05D 16/0636 137/505.41 |
| 3,545,471 | A | * | 12/1970 | Taplin | G05D 16/0641 137/116.5 |
| 3,547,143 | A | * | 12/1970 | Mills, Jr. | G05D 16/0663 137/315.05 |
| 3,586,033 | A | * | 6/1971 | Hieber | B64D 39/06 137/220 |
| 3,621,867 | A | * | 11/1971 | Johnson | F16K 17/085 137/116.5 |
| 3,665,956 | A | * | 5/1972 | Hammon | G05D 16/0663 137/116.5 |
| 4,171,004 | A | * | 10/1979 | Cerrato | G05D 16/0663 137/115.14 |
| 4,431,026 | A | * | 2/1984 | Fehrenbach | G05D 16/0658 137/207 |
| 4,624,277 | A | * | 11/1986 | Veite | G05D 16/0619 137/116.3 |
| 4,966,183 | A | * | 10/1990 | Williamson, Jr. | G05D 16/0663 137/116.5 |
| 4,986,298 | A | * | 1/1991 | Martin | A61M 1/0031 137/15.22 |
| 5,261,447 | A | * | 11/1993 | Boticki | G05D 16/163 137/493.2 |
| 5,890,512 | A | * | 4/1999 | Gotthelf | G05D 16/0663 137/375 |
| 6,068,014 | A | * | 5/2000 | Tomita | G05D 16/0666 137/116.5 |
| 6,554,017 | B2 | * | 4/2003 | Berger | G05D 16/0663 137/115.13 |
| 8,342,201 | B2 | * | 1/2013 | Nitta | G05D 16/0669 137/505.11 |
| 8,485,213 | B2 | * | 7/2013 | Hawkins | F16K 17/105 137/116.5 |
| 8,627,846 | B2 | * | 1/2014 | Grenaway | G05D 16/163 137/491 |
| 8,869,827 | B2 | * | 10/2014 | Yamauchi | G05D 16/0669 137/505.13 |
| 2015/0263449 | A1 | * | 9/2015 | Watkins | H01R 13/5219 439/277 |
| 2017/0298946 | A1 | * | 10/2017 | Weiske | F04D 1/00 |

FOREIGN PATENT DOCUMENTS

| | | |
|---|---|---|
| JP | 7-8604 | 2/1995 |
| KR | 10-2005-0072393 A | 7/2005 |

OTHER PUBLICATIONS

Combined Chinese Office Action and Search Report dated Apr. 25, 2019 in Patent Application No. 201810342601.9 (with partial English translation and English translation of categories of cited documents), 15 pages.

* cited by examiner

AIR PRESSURE CONTROL DEVICE AND ADJUSTMENT VALVE

CROSS-REFERENCE TO RELATED APPLICATIONS

The present application is based on and claims priority to Japanese Application No. 2017-081882, filed Apr. 18, 2017, the entire contents of which are incorporated herein by reference.

BACKGROUND

1. Field

The present disclosure relates to an air pressure control device including a valve seat supported by a diaphragm, and a compression coil spring for biasing the valve seat. The present invention further relates to an adjustment valve equipped with the air pressure control device.

2. Description of the Related Art

As known in the related art, an air pressure apparatus for driving an actuator by air pressure includes an air pressure control device to control an operation of the actuator. That type of air pressure control device has a mechanism of reducing the pressure of air supplied from an air pressure supply source, as disclosed in Japanese Unexamined Utility Model Registration Application Publication No. 7-8604, for example.

Figure 5:
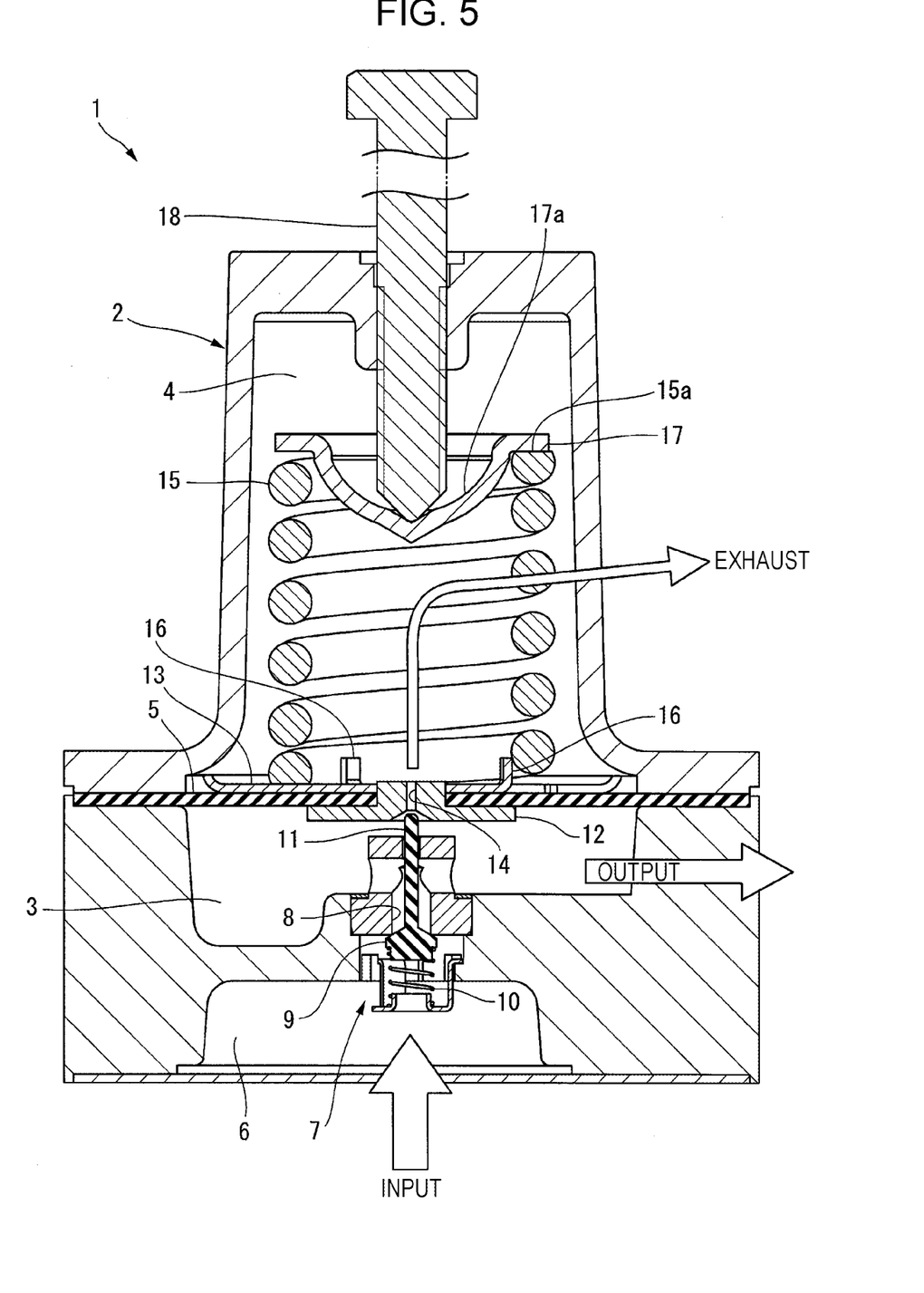
FIG. 5 is a sectional view of an air pressure control device of related art.

A pressure reducing valve 1 illustrated in FIG. 5, for example, is one simplest example of the above-mentioned type of air pressure control device. The pressure reducing valve 1 illustrated in FIG. 5 includes a diaphragm 5 that partitions an inner space of a housing 2 into a first air chamber 3 positioned at the lower side in FIG. 5 and a second air chamber 4 positioned at the upper side. The first air chamber 3 is connected to an air inlet of an actuator (not illustrated). The first air chamber 3 is further connected, through a poppet valve 7, to an upstream-side air chamber 6 positioned at the lowermost side in FIG. 5. The second air chamber 4 is released to the atmosphere through a communication hole (not illustrated).

High-pressure air is supplied to the upstream-side air chamber 6 from an air pressure supply source (not illustrated). The poppet valve 7 includes a communication hole 8 for communicating the first air chamber 3 and the upstream-side air chamber 6 with each other, a valve member 9 for opening or closing an opening of the communication hole 8, the opening being positioned at the upstream side (i.e., at the lower side in FIG. 5), and a spring member 10 for biasing the valve member 9 in a closing direction. The valve member 9 includes a pin 11 projecting into the first air chamber 3 through the communication hole 8.

A valve seat 12 and an area plate 13 are attached to the diaphragm 5. The valve seat 12 penetrates through the diaphragm 5. A through-hole 14 for communicating the first air chamber 3 and the second air chamber 4 with each other is bored in the valve seat 12. The through-hole 14 is positioned coaxially with the pin 11 of the valve member 9. A hole diameter of the through-hole 14 is smaller than an outer diameter of the pin 11. An opening portion of the through-hole 14 at the side facing the pin 11 is formed in a flaring shape with the hole diameter gradually increasing toward an end of the opening portion. A tip end of the pin 11 is inserted into the opening portion of the through-hole 14.

The area plate 13 serves to bear the spring force of a compression coil spring 15, and it is fixed to the valve seat 12 in the second air chamber 4. A plurality of pawls 16 to be held in engagement with an inner peripheral portion of the compression coil spring 15 is vertically disposed on the area plate 13.

The compression coil spring 15 serves to bias the diaphragm 5 toward the first air chamber 3. The compression coil spring 15 is held at one end by the area plate 13 and at the opposite end by an upper seat 17.

The upper seat 17 is formed in a disk-like shape overlapping the opposite end of the compression coil spring 15, and has a recessed portion 17a into which a pointed tip end of a pressure adjusting bolt 18 is inserted. The pressure adjusting bolt 18 is meshed with a housing 2.

The diaphragm 5 of the pressure reducing valve 1 is displaced such that the spring force of the compression coil spring 15 and the pressure in the first air chamber 3 are balanced. When the pressure in the first air chamber 3 decreases from a state in which the spring force of the compression coil spring 15 and the pressure in the first air chamber 3 are balanced, the diaphragm 5 is displaced toward the first air chamber 3 by the spring force of the compression coil spring 15, and the valve seat 12 is pressed against the pin 11 of the valve member 9. At that time, the pin 11 closes the through-hole 14 in the valve seat 12, whereby the communicating state between the first air chamber 3 and the second air chamber 4 is eliminated. When the pin 11 is further pushed by the valve seat 12, the communication hole 8 is opened, thus allowing air to flow into the first air chamber 3 from the upstream-side air chamber 6 through the communication hole 8. The inflow air supplied to the actuator from the first air chamber 3

On the other hand, when the pressure in the first air chamber 3 increases beyond the spring force of the compression coil spring 15, the diaphragm 5 is displaced toward the second air chamber 4, and the valve seat 12 is moved away from the pin 11 of the valve member 9. In that state, the valve member 9 closes the communication hole and the communicating state between the upstream-side air chamber 6 and the first air chamber 3 is eliminated. Furthermore, the air in the first air chamber 3 flows into the second air chamber 4 via the through-hole 14, and is then exhausted to the atmosphere from the second air chamber 4.

The pressure reducing valve 1 constituted as described above has a problem that a center of the through-hole 14 in the valve seat 12 is slightly misaligned from an axis of the pin 11, and a gap is generated between the through-hole 14 and the pin 11 of the valve member 9, thereby causing an exhaust leak (bleeding) in some cases. The exhaust leak becomes a factor of not only making an output pressure unstable, but also bringing about loss of energy. Another problem is that exhaust sounds are noisy.

Moreover, with the occurrence of the exhaust leak, the tip end of the pin 11 of the poppet valve 7 may be forced to repeatedly strike against the valve seat 12 in some cases. In those cases, contact portions of the pin 11 and the valve seat 12 are worn to such an extent that a significant exhaust leak occurs continuously. In addition, when wears of the contact portions of the pin 11 and the valve seat 12 are progressed, the pressure reducing valve may come into a state in which pressure adjustment is failed, thus causing an adjustment valve to malfunction (for example, not to operate or to operate slowly), and giving influences on a variety of apparatuses connected in subsequent stages.

Until now, in order to prevent the above-mentioned exhaust leak, it has been proposed, for example, to increase stability of position of the valve member 9, or to set the pin 11 of the valve member 9 and the through-hole 14 to be positioned coaxially with each other in a manufacturing process. However, because the diaphragm 5 is made of rubber, the position of the valve seat 12 is changed and the center of the through-hole 14 is slightly misaligned from the axis of the pin 11 due to strong influences given by behaviors of the compression coil spring 15 when it is compressed or extended.

When the compression coil spring 15 is compressed, the following three phenomena mainly generate.

Figure 6A:
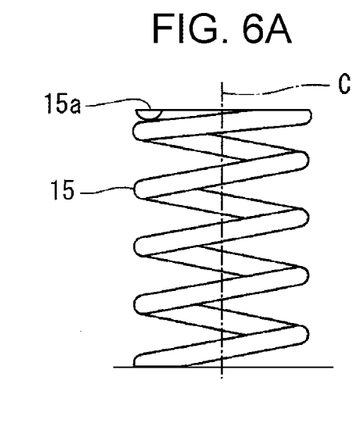
FIGS. 6A and 6B are side views referenced to explain behaviors of a compression coil spring when it is compressed; specifically.
Figure 6B:
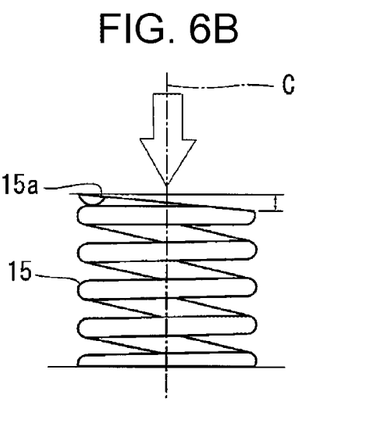

In the first phenomenon, an end surface 15a of the compression coil spring 15, which is formed perpendicularly to a center line C of the compression coil spring 15 as illustrated in FIG. 6A, is inclined after the compression as illustrated in FIG. 6B. When the end surface 15a of the compression coil spring 15 is inclined, the area plate 13 and the upper seat 17 are also inclined correspondingly. As a consequence, the position of the valve seat 12 is changed.

Figure 7:
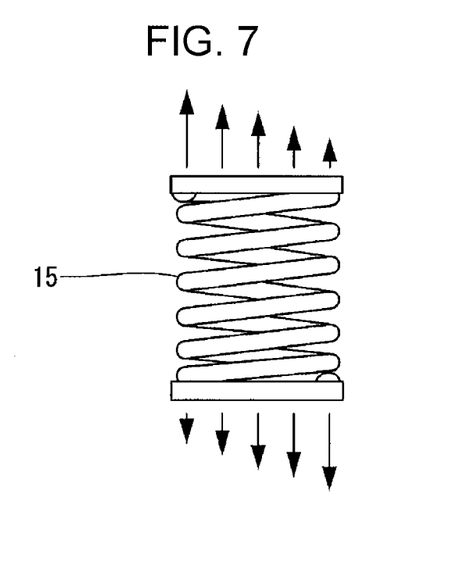
FIG. 7 is a side view referenced to explain the magnitudes of spring forces received from both end surfaces of the compression coil spring when it is compressed.

In the second phenomenon, as illustrated in FIG. 7 because the area plate 13 and the upper seat 17 are always subjected to vertical spring forces, the magnitudes of the spring forces received by those members become not uniform. In FIG. 7, the magnitudes of the spring forces are indicated by lengths of arrows. Because the magnitudes of the spring forces received by the area plate 13 and the upper seat 17 are not uniform as described above, the area plate 13 and the upper seat 17 are inclined.

Figure 8A:
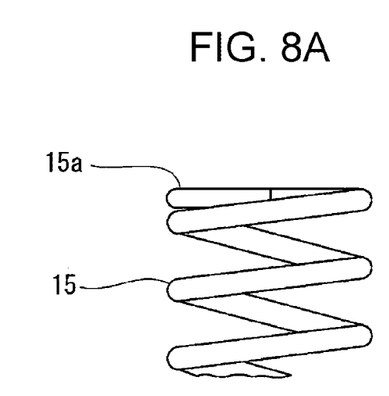
FIGS. 8A and 8B are side views referenced to explain a twist motion of the compression coil spring when it is compressed; specifically.
Figure 8B:
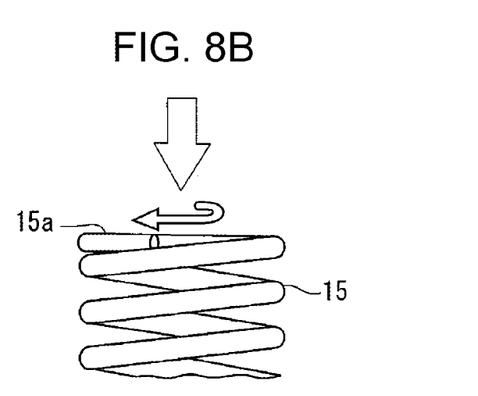

In the third phenomenon, because the compression coil spring 15 is compressed from a state illustrated in FIG. 8A to a state illustrated in FIG. 8B, both the ends of the compression coil spring 15 are twisted, this phenomenon being called "twisting". Torque attributable to the "twisting" is transmitted to the area plate 13 and the upper seat 17, thereby causing torsions and wrinkles of the diaphragm 5. Hence the position of the valve seat 12 is changed.

Because the upper seat 17 is in point contact with the pressure adjusting bolt 18, the upper seat 17 is able to incline or twist together with the end surface 15a of the compression coil spring 15. In contact portions of the upper seat 17 and the pressure adjusting bolt 18, however, a large friction force generates with the contact portions receiving not only frictional resistance caused by the contact, but also a reaction force (spring force) of the compression coil spring 15. This may result in that the upper seat 17 is worn or brought into an eccentric state relative to the pressure adjusting bolt 18, and that the upper seat 17 is hard to slide in some cases. Furthermore, the above-described friction force is greatly changed depending on a position of the pressure adjusting bolt 18 and an amount of compression of the compression coil spring 15, thereby making the contact state of the pressure adjusting bolt 18 unstable and increasing the torque given to the pressure adjusting bolt 18. Thus, a difficulty resides in solving the problems attributable to the above-described three phenomena by utilizing the inclination and rotation of the upper seat 17. In order to solve those problems, it is conceivable to provide, on the area plate 13 and the upper seat 17, guides (not illustrated) for restricting the operating directions of those members. However, using those guides is practically impossible for the reasons of an increase in operating force due to frictional resistances of the guides, wears of the guides, and scoring of sliding portions.

SUMMARY

With intent to solve the above-described problems, an object of the present disclosure is to provide an air pressure control device in which a valve seat supported by a diaphragm is displaced correctly without suffering from influences of behaviors of a compression coil spring when it is compressed or extended, and in which an exhaust leak and a failure of pressure adjustment do not occur, and is to provide an adjustment valve equipped with the air pressure control device.

To achieve the above object, the present disclosure provides an air pressure control device including a diaphragm supported by a housing and partitioning an inner space of the housing into one air chamber and the other air chamber, a valve seat supported by the diaphragm in a state of penetrating through the diaphragm, the valve seat including a through-hole via which the one air chamber and the other air chamber are communicated with each other, a valve member arranged in the one air chamber, the valve member being movable closer to or away from the valve seat to close or open the through-hole, a pressure adjusting mechanism that adjusts a force applied to the diaphragm from a side including the other air chamber, and a compression coil spring disposed in the other air chamber and applying a spring force to a spring receiving member disposed on the valve seat, wherein a bearing is interposed between the valve seat and the spring receiving member.

In the air pressure control device according to the present disclosure, the pressure adjusting mechanism may include a pressure adjusting bolt meshed with the housing, a pressing member held in contact with an end of the compression coil spring at a side opposite to the spring receiving member, and a bearing interposed between the pressure adjusting bolt and the pressing member.

In the air pressure control device according to the present disclosure, the bearing may be a spherical-surface slide bearing allowing inclination and rotation.

The present disclosure further provides an adjustment valve in which control of a valve opening degree is performed by a valve positioner including the air pressure control device according to the present disclosure.

According to the present disclosure, the bearing allows the spring receiving member to move relative to the valve seat. Therefore, the valve seat is less affected by the above-described three phenomena generating when the compression coil spring is compressed or extended, i.e., the inclination of the end surface (first phenomenon), non-uniformity of the spring forces (second phenomenon), and the occurrence of torque due to the twisting (i.e., the third phenomenon).

As a result, the present disclosure can provide the air pressure control device which is less affected by behaviors of the compression coil spring when it is compressed or extended, and in which the valve seat supported by the diaphragm is displaced correctly and an exhaust leak does not occur.

Furthermore, in the adjustment valve according to the present disclosure, control of a valve opening degree is performed by the valve positioner including the air pressure control device that is less affected by the behaviors of the compression coil spring, and that is free from the exhaust leak and the failure of pressure adjustment. As a result, the highly-reliable adjustment valve can be obtained which is able to control the opening degree with high accuracy, to ensure a smaller loss of energy, and not to cause a malfunction of the adjustment valve.

BRIEF DESCRIPTION OF THE DRAWINGS

FIG. 6A represents a state before the compression, and FIG. 6B represents a state after the compression;

FIG. 8A represents a state before the compression, and FIG. 8B represents a state after the compression.

DETAILED DESCRIPTION

First Embodiment

An air pressure control device according to a first embodiment of the present disclosure will be described in detail below with reference to FIGS. 1 and 2. This embodiment represents an example in which the present disclosure is applied to a pressure reducing valve that is an air pressure control device with the simplest configuration.

Figure 1:
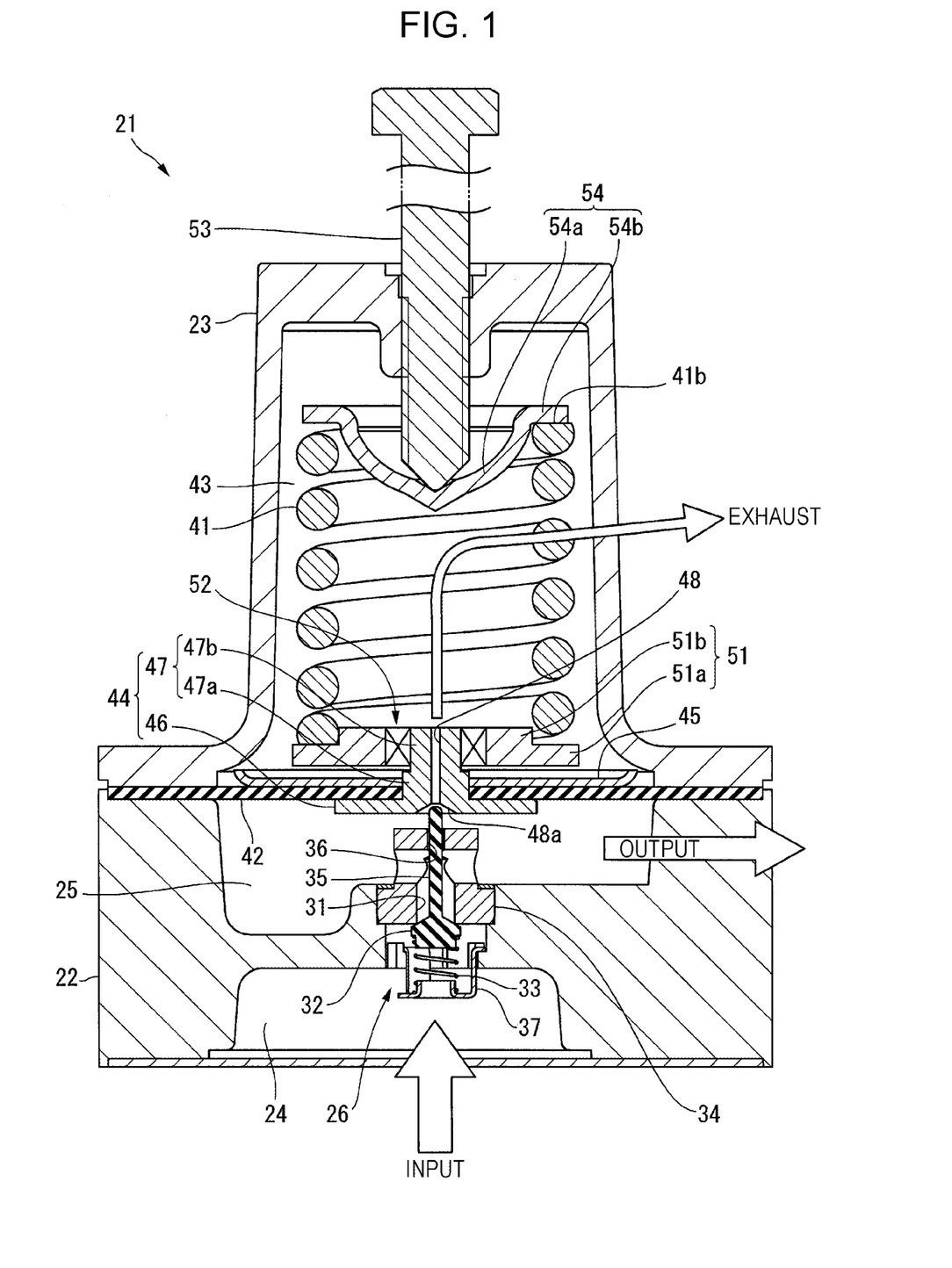
FIG. 1 is a sectional view of an air pressure control device according to a first embodiment.

A pressure reducing valve 21 serving as an air pressure control device, illustrated in FIG. 1, is used to reduce the pressure of high-pressure air to a predetermined level, and to supply the air under the predetermined pressure to an actuator (not illustrated).

The pressure reducing valve 21 includes a first housing 22 positioned at the lower side in FIG. 1, and a second housing 23 mounted to the first housing 22. For the sake of convenience, the following description is made on an assumption that the lower side in FIG. 1 is called the one end side of the pressure reducing valve 21, and that the upper side in FIG. 1 is called the opposite end side of the pressure reducing valve 21.

An upstream-side air chamber 24 is formed at the one end side of the first housing 22, and a first air chamber 25 is formed at the opposite end side of the first housing 22. The upstream-side air chamber 24 is connected to an air pressure supply source (not illustrated) and is supplied with pressurized air from the air pressure supply source. The first air chamber 25 is connected to an air inlet of the actuator (not illustrated). A poppet valve 26, described later, is disposed between the upstream-side air chamber 24 and the first air chamber 25. In this embodiment, the first air chamber 25 corresponds to "one air chamber" called so in the present disclosure.

The poppet valve 26 includes a communication hole 31 for communicating the upstream-side air chamber 24 and the first air chamber 25 with each other, a valve member 32 for opening or closing an opening of the communication hole 31, the opening being positioned at the one end side thereof (i.e., at the one end side of the pressure reducing valve 21), and a valve member spring 33 for biasing the valve member 32 toward the opposite end side of the pressure reducing valve 21.

The communication hole 31 is bored in a valve seat member 34 that is fixed to the first housing 22. The valve member 32 is formed in a predetermined shape to be partly located in the opening of the communication hole 31, and is arranged in an axial center region of the pressure reducing valve 21. The valve member 32 is pushed by the valve member spring 33, thus closing the opening of the communication hole 31. The valve member 32 includes a circular-columnar pin 35 extending in a direction toward the opposite end side of the pressure reducing valve 21 from the one end side. The pin 35 is movably fitted into a small hole 36, which is formed in the valve seat member 34, such that a moving direction of the pin 35 is restricted to some extent. A tip end of the pin 35 is positioned to project into the first air chamber 25 from the valve seat member 34. The valve member spring 33 is formed by a compression coil spring, and is supported to the first housing 22 with the aid of a holder 37.

The second housing 23 is formed in a bottom-equipped cylindrical shape opened toward the first housing 22, and a main spring 41 in the form of a compression coil spring is disposed in the second housing 23. The main spring 41 is arranged in the axial center region of the pressure reducing valve 21 in a state of extending parallel to the direction toward the opposite end side of the pressure reducing valve 21 from the one end side. A structure for supporting the main spring 41 will be described later. In this embodiment, the main spring 41 corresponds to a "compression coil spring" called so in the present disclosure.

A diaphragm 42 is held between the second housing 23 and the first housing 22 in a sandwiched state. The diaphragm 42 is formed of a thin plate made of a rubber material, and it partitions the first air chamber 25 defined in the first housing 22 and a second air chamber 43 defined in the second housing 23. The second air chamber 43 is opened to the atmosphere through an exhaust passage (not illustrated). In this embodiment, the second air chamber 43 corresponds to the "other air chamber" called so in the present disclosure.

A valve seat 44 positioned at the side facing the valve member 32 of the poppet valve 26 and an area plate 45 are attached to the diaphragm 42. The valve seat 44 is constituted by a disk portion 46 arranged in the first air chamber 25 and holding the diaphragm 42 in cooperation with the area plate 45 in a sandwiching relation, and by a circular-columnar shaft portion 47 extending from the disk portion 46 toward the opposite end side of the pressure reducing valve 21 while penetrating through the diaphragm 42. The valve seat 44 is positioned coaxially with the pin 35 of the poppet valve 26. A through-hole 48 for communicating the first air chamber 25 and the second air chamber 43 with each other is bored in an axial center region of the shaft portion 47 of the valve seat 44. A hole diameter of the through-hole 48 is smaller than an outer diameter of the pin 35. An opening portion 48a of the through-hole 48 at the side facing the first air chamber 25 is formed in a flaring shape with the hole diameter gradually increasing toward an end of the opening portion 48a. A tip end of the pin 35 is inserted into the opening portion 48a that has a wall surface in the form of a flaring surface.

Figure 2:
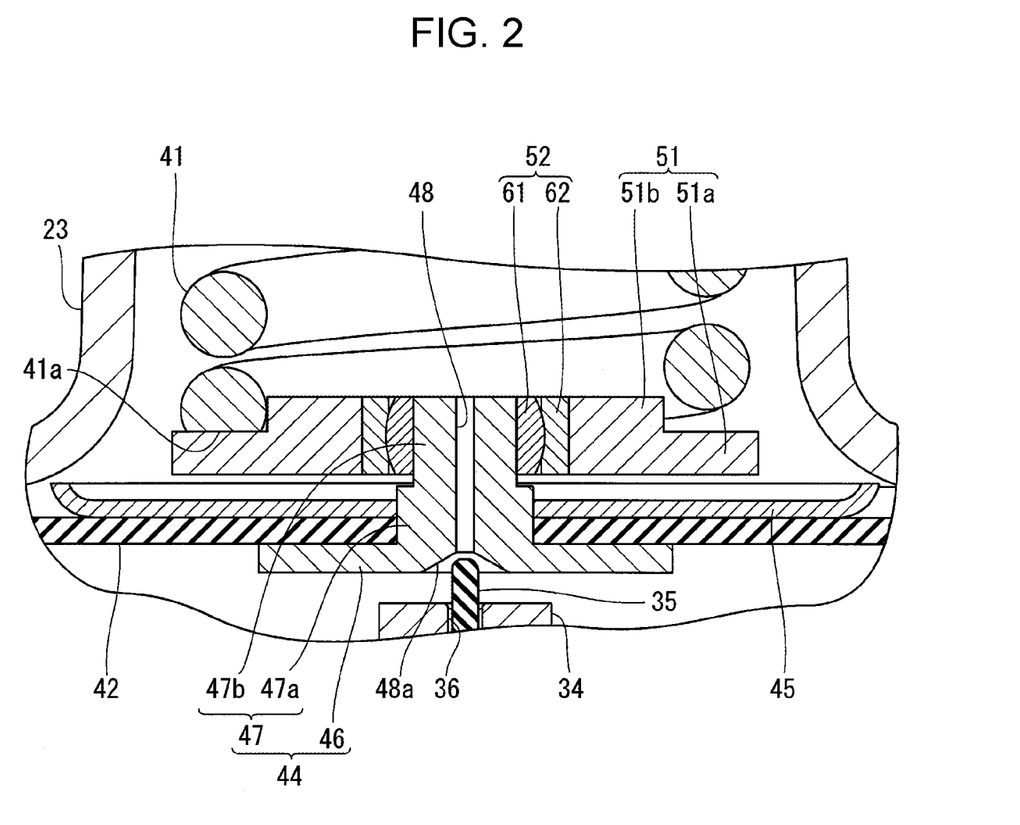
FIG. 2 is a sectional view illustrating principal part in an enlarged scale.

As illustrated in FIG. 2, the shaft portion 47 of the valve seat 44 is constituted by a large-diameter portion 47a penetrating through both the diaphragm 42 and the area plate 45, and a small-diameter portion 47b projecting from the large-diameter portion 47a toward the opposite end side of the pressure reducing valve 21. The area plate 45 is fixed to the large-diameter portion 47a of the shaft portion 47. The area plate 45 is in the form of a disk, and is fixed to the large-diameter portion 47a in a state of pushing the diaphragm 42 against the disk portion 46 of the valve seat 44. A lower seat 51 (described below) is attached to the small-diameter portion 47b of the shaft portion 47.

The lower seat 51 is in the form of a circular ring plate including a large-diameter portion 51a positioned at the side facing the area plate 45 and a small-diameter portion 51b positioned at the opposite side. The lower seat 51 is attached to the shaft portion 47 (specifically, the small-diameter portion 47b) of the valve seat 44 with a bearing 52 (described later) interposed therebetween.

One end surface 41a of the main spring 41 is laid on the large-diameter portion 51a of the lower seat 51. The small-diameter portion 51b of the lower seat 51 is fitted into one end portion of the main spring 41. The one end portion of the main spring 41 is supported by the lower seat 51. In this embodiment, the lower seat 51 corresponds to a "spring receiving member" called so in the present disclosure.

As illustrated in FIG. 1, a pressure adjusting bolt 53 is meshed with a bottom portion (i.e., an opposite end portion of the pressure reducing valve 21) of the second housing 23 having the bottom-equipped cylindrical shape. The pressure adjusting bolt 53 is arranged in the axial center region of the pressure reducing valve 21, and is positioned coaxially with the pin 35 and the shaft portion 47 of the valve seat 44.

A tip end of the pressure adjusting bolt 53 is formed in a pointed shape with its central portion projecting maximally. The pressure adjusting bolt 53 is held in contact with an upper seat 54 and pushes an opposite end of the main spring 41 toward the one end side of the pressure reducing valve 21 with the upper seat 54 interposed therebetween.

The upper seat 54 includes a recessed portion 54a inserted into an inner space of the main spring 41, and a flange portion 54b extending outward from the recessed portion 54a and laid on an opposite end surface 41b of the main spring 41. The pressure adjusting bolt 53 is in contact with a deepest central region of the recessed portion 54a. By changing a distance through which the pressure adjusting bolt 53 is screwed in, therefore, the spring force of the main spring 41 is changed, whereby a force applied to the diaphragm 42 from the side including the second air chamber 43 can be adjusted.

In this embodiment, the pressure adjusting bolt 53 and the upper seat 54 correspond to a "pressure adjusting mechanism" called so in the present disclosure.

The bearing 52 interposed between the valve seat 44 and the lower seat 51 is a spherical-surface slide bearing. As illustrated in FIG. 2, the bearing 52 used in this embodiment is of the type including an inner ring 61 and an outer ring 62. The inner ring 61 is fixedly fitted over the small-diameter portion 47b of the shaft portion 47 of the valve seat 44. An outer surface of the inner ring 61 is formed in a shape defining part of a spherical surface. The outer ring 62 is fixedly fitted into an axial center portion of the lower seat 51 in such a state that the outer ring 62 is slidably fitted over the inner ring 61. Since the bearing 52 constituted as the spherical-surface slide bearing is interposed between the valve seat 44 and the lower seat 51, the lower seat 51 is allowed to incline and rotate relative to the valve seat 44.

In the pressure reducing valve 21 constituted as described above, when the pressure adjusting bolt 53 is screwed into the second housing 23, the spring force of the main spring 41 is increased and the pressure of the air supplied from the first air chamber 25 to the actuator is increased. More specifically, the valve seat 44 is pushed by the spring force of the main spring 41, and the pin 35 of the poppet valve 26 is pushed in turn by the valve seat 44, whereby the poppet valve 26 is opened. Upon the poppet valve 26 being opened, the high-pressure air flows into the first air chamber 25 from the upstream-side air chamber 24 through the communication hole 31, and is then supplied to the actuator.

On the other hand, when the pressure adjusting bolt 53 is unscrewed relative to the second housing 23, the spring force of the main spring 41 is reduced, and the diaphragm 42 is pushed by the air pressure in the first air chamber 25, thus causing the valve seat 44 to displace in a direction away from the pin 35. At that time, since the pin 35 departs away from the valve seat 44, the poppet valve 26 is closed, and inflow of the air into the first air chamber 25 is stopped. Furthermore, upon the valve seat 44 departing away from the pin 35, the through-hole 48 in the valve seat 44 is opened. Hence the air in the first air chamber 25 flows into the second air chamber 43 via the through-hole 48 and is then exhausted to the atmosphere through the second air chamber 43. Thus, the pressure of the air supplied to the actuator can be controlled to a constant reduced level by adjusting the distance through which the pressure adjusting bolt 53 is screwed in.

In the pressure reducing valve 21 according to this embodiment, the bearing 52 is disposed in a portion supporting the spring force (spring load) of the main spring 41) in a region near the axis (i.e., in a joining portion between the lower seat 51 and the valve seat 44). Thus, since the bearing 52 allows the lower seat 51 to move relative to the valve seat 44, behaviors of the main spring 41 when it is compressed or extended can be absorbed by the bearing 52 and prevented from being transmitted to the valve seat 44.

Therefore, the valve seat 44 is less affected by the behaviors of the main spring 41, including the above-described three phenomena generating when the valve seat 44 is compressed or extended. In other words, the pressure reducing valve 21 is less subjected to influences such as not only the inclination of the end surface of the lower seat 51 (i.e., the first phenomenon), the non-uniformity of spring forces (i.e., the second phenomenon), and the occurrence of torque due to the twisting (i.e., the third phenomenon), but also rotational friction force and eccentric misalignment of the upper seat 54 that receives the torque of the main spring 41. Furthermore, stresses generated by the inclination and the rotation are suppressed from acting on the diaphragm 42. In addition, since the lower seat 51 is allowed to incline and rotate, the upper seat 54 is inclined and rotated to less extent. As a result, wears of the contact portions of the upper seat 54 and the pressure adjusting bolt 53, and torque given to the pressure adjusting bolt 53 are reduced.

Thus, according to this embodiment, because of substantially not suffering from the influences of the behaviors of the main spring 41 when it is compressed or extended, the valve seat 44 supported by the diaphragm 42 is displaced correctly, and misalignment between the center of the through-hole 48 and the axis of the pin 35 is not caused. It is hence possible to provide the air pressure control device in which an exhaust leak and a failure of pressure adjustment do not occur.

The pressure reducing valve 21 (air pressure control device) according to this embodiment can be realized just by mounting the bearing 52 to the air pressure control device of related art without requiring significant structural change and enlargement in size. Moreover, unlike the case of restricting an operating direction of the lower seat 51 with the provision of a guide, there is no possibility of generating frictional resistance and wear of the guide, as well as scoring of sliding portions.

The bearing 52 used in this embodiment is the spherical-surface slide bearing allowing inclination and rotation. Therefore, the inclination and the rotation caused with the compression of the main spring 41 can be entirely prevented from being transmitted to the valve seat 44. Thus, according to this embodiment, since it is ensured that the valve seat 44 is always displaced along the axis of the valve member 32, the air pressure control device can be obtained in which the exhaust leak and the failure of pressure adjustment do not occur.

Second Embodiment

Figure 3:
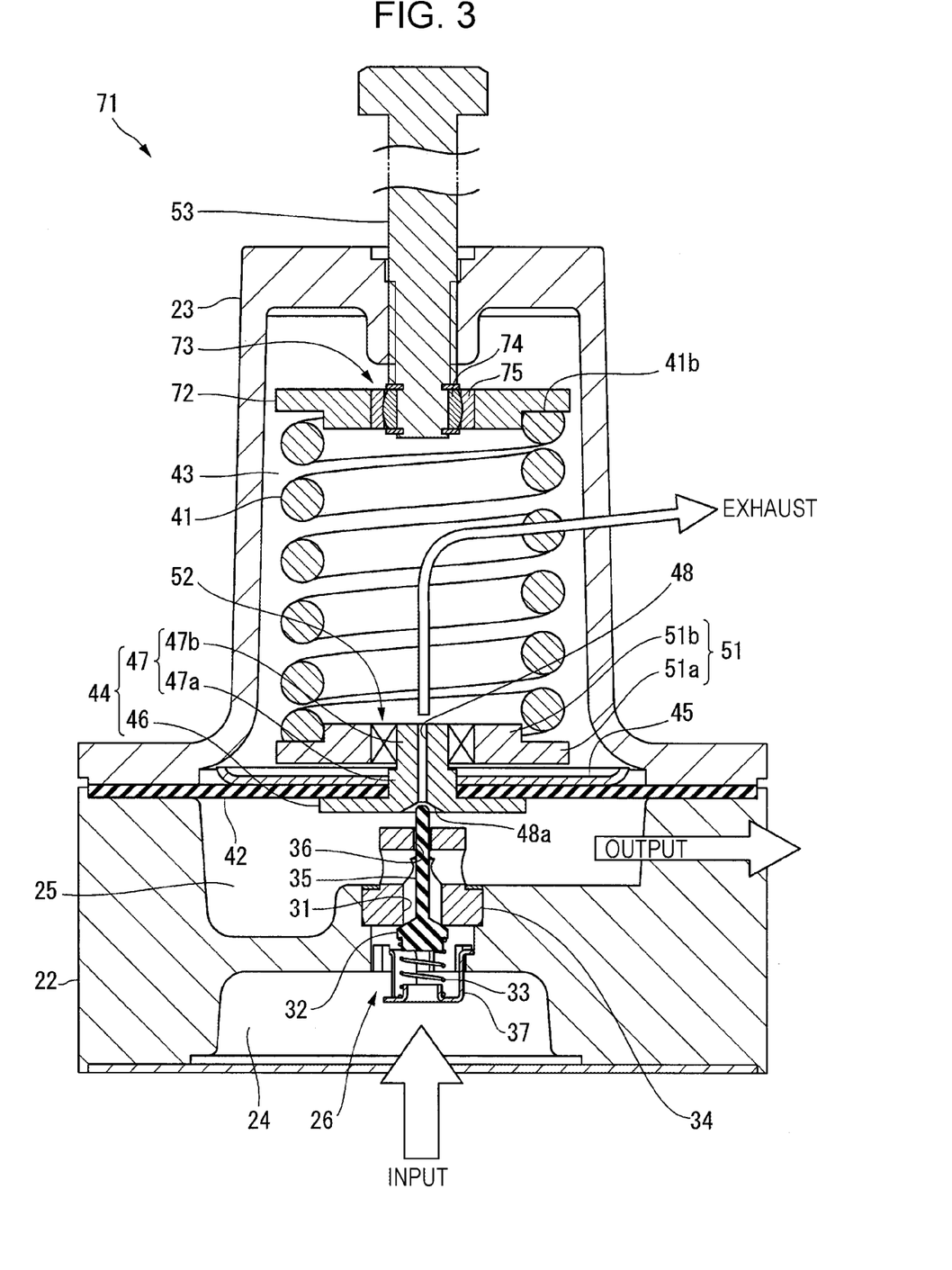
FIG. 3 is a sectional view of an air pressure control device according to a second embodiment.

As illustrated in FIG. 3, the bearing may be further disposed in a portion supporting the opposite end of the main spring. In FIG. 3, the same or equivalent members as or to those described with reference to FIGS. 1 and 2 are denoted by the same reference signs, and detailed description of those members is omitted as appropriate.

In a pressure reducing valve 71 illustrated in FIG. 3, a bearing 73 is interposed between the pressure adjusting bolt 53 and an upper seat 72.

The bearing 73 is a spherical-surface slide bearing including an inner ring 74 and an outer ring 75 over which the inner ring 74 is fitted. The inner ring 74 is attached to the pressure adjusting bolt 53 in such a state that movement of the inner ring 74 in the axial direction of the pressure adjusting bolt 53 is restricted while the inner ring 74 is allowed to rotate. The outer ring 75 is fixedly fitted in an axial center portion of the upper seat 72. The upper seat 72 in this embodiment is in the form of a disk as with the lower seat 51. In this embodiment, the upper seat 72 corresponds to a "pressing member" called so in the claims of the present disclosure.

Structures of portions for attaching the bearing 73 to the pressure adjusting bolt 53 and the upper seat 72 and the shape of the upper seat 72 in this embodiment are not limited to those examples illustrated in FIG. 3, and they may be modified as appropriate.

According to this embodiment, inclination and rotation of the upper seat 72 relative to the pressure adjusting bolt 53 are absorbed by the bearing 73, whereby eccentric misalignment of the upper seat 72 relative to the pressure adjusting bolt 53 and wear of the upper seat 72 are suppressed. Therefore, the air pressure control device can be obtained which is even less affected by the behaviors of the main spring 41 when it is compressed or extended. In addition, with the provision of the bearing 73, frictional resistance can be reduced, and torque given to the pressure adjusting bolt 53 can be reduced.

The above-described embodiments represent examples using, as the bearings 52 and 73, spherical-surface slide bearings of the so-called radial type including the inner rings 61 and 74 and the outer rings 62 and 75, respectively. However, the spherical-surface slide bearings may be of the so-called thrust type including a spherical surface projecting in the direction toward the opposite end side of the pressure reducing valve 21 from the one end side, and a concave surface slidably fitted to the spherical surface.

The bearings 52 and 73 may be rolling bearings. In the case of using the rolling bearings, torque generated when the main spring 41 is compressed or extended is absorbed by the bearings 52 and 73.

The above-described pressure reducing valves according to the first and second embodiments can be used in the following applications (1) to (6).

(1) Air supply control valves (valve positioners) (for process control and air-conditioning control) and pressure transmitters, which are used in industrial instruments, adjustment valves, etc.
(2) Driving devices such as pneumatic cylinders and motors.
(3) Gas feed mechanisms in gas analyzers.
(4) Removal of cutting dust, parts washing, air chucks in automatic working machines.
(5) Spray guns for coating.
(6) Air drivers, nut runners, and wire wrapping in automatic assembly machines, as well as closing machines in railroad vehicles.

Third Embodiment

Figure 4:
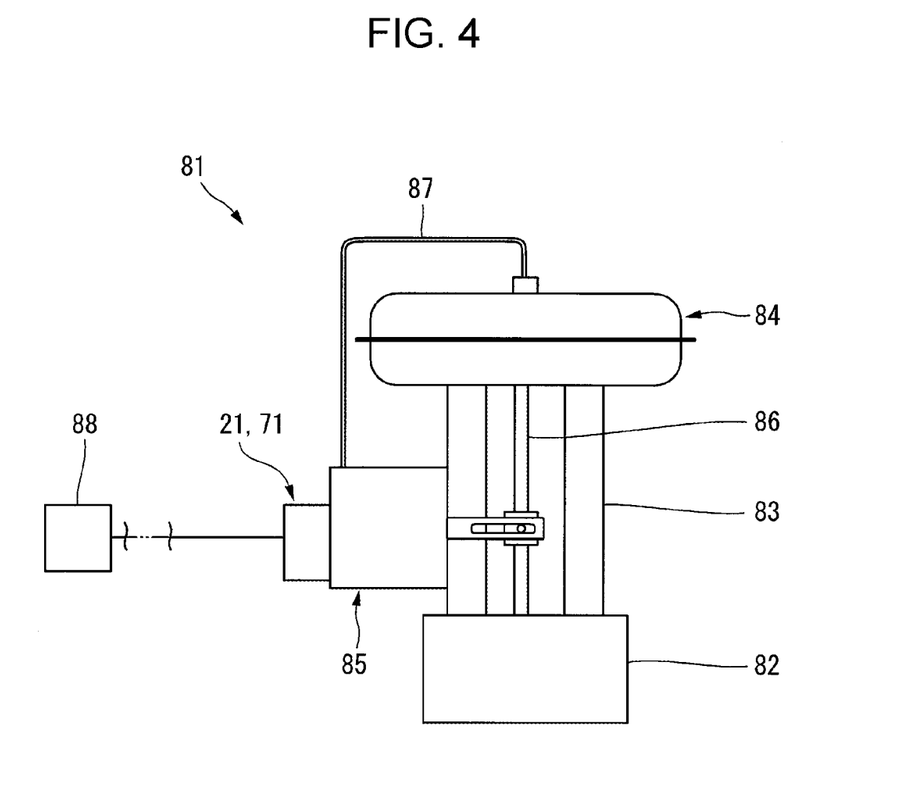
FIG. 4 is a block diagram illustrating a configuration of an adjustment valve equipped with the air pressure control device.

An embodiment of an adjustment valve according to the present disclosure will be described in detail below with reference to FIG. 4. In FIG. 4, the same or equivalent members as or to those described with reference to FIGS. 1 to 3 are denoted by the same reference signs, and detailed description of those members is omitted as appropriate.

An adjustment valve 81 illustrated in FIG. 4 includes a valve main body 82, an actuator 84 supported by the valve main body 82 with the aid of a bracket 83, and a valve positioner 85 supported by the bracket 83.

The valve main body 82 includes a valve member (not illustrated). The valve member is connected to the actuator 84 through a drive shaft 86.

The actuator 84 drives the drive shaft 86 by air pressure. The air pressure is supplied from the valve positioner 85 through an air pipe 87.

The valve positioner 85 includes the pressure reducing valve 21 described in the first embodiment or the pressure reducing valve 71 described in the second embodiment to supply air under pressure that has been reduced to a predetermined level by the pressure reducing valve 21 (or 71). The pressure reducing valve 21 (or 71) is connected to an air pressure supply source 88, and pressurized air is supplied from the air pressure supply source 88.

The valve positioner 85 controls a level of the air pressure supplied to the actuator 84 such that a current opening degree of the adjustment valve 81 is matched with a target opening degree. In other words, in the adjustment valve 81, control of the valve opening degree is performed by the valve positioner 85 including the pressure reducing valve 21 (or 71). As described above, the pressure reducing valve 21 (or 71) is less affected by the behaviors of the compression coil spring (i.e., the main spring 41), and is free from the exhaust leak and the failure of pressure adjustment.

Thus, according to this embodiment, the highly-reliable adjustment valve can be obtained which is able to control the opening degree with high accuracy, to ensure a smaller loss of energy, and not to cause a malfunction of the adjustment valve.

The above embodiments have been described in connection with the examples in which the present disclosure is applied to the pressure reducing valves 21 and 71. However, the present disclosure can be further applied to other types of air pressure control devices, such as a pilot relay used in a positioner for an actuator. When the present disclosure is applied to the pilot relay, a pressure adjusting mechanism of the type supplying pressurized air to the second air chamber 43 and pressing the diaphragm 42 by pressure of the supplied air may be used.

What is claimed is:

1. An air pressure control device, comprising:
a diaphragm supported by a housing and partitioning an inner space of the housing into one air chamber and another air chamber;

a valve seat supported by the diaphragm in a state of penetrating through the diaphragm, the valve seat including a through-hole via which the one air chamber and the other air chamber are communicated with each other;
a valve member arranged in the one air chamber, the valve member being movable closer to or away from the valve seat to close or open the through-hole;
a pressure adjusting mechanism that adjusts a force applied to the diaphragm from a side including the other air chamber; and
a compression coil spring disposed in the other air chamber and applying a spring force to a spring receiving member disposed on the valve seat,
wherein a first bearing is interposed between the valve seat and the spring receiving member, the first bearing being a spherical-surface slide bearing allowing inclination and rotation.

2. The air pressure control device according to claim 1, wherein the pressure adjusting mechanism comprises:
a pressure adjusting bolt meshed with the housing;
a pressing member held in contact with an end of the compression coil spring at a side opposite to the spring receiving member; and
a second bearing interposed between the pressure adjusting bolt and the pressing member.

3. The air pressure control device of claim 1, wherein the slide hearing allows rotation of the spring receiving member.

4. The air pressure control device of claim 1, wherein the slide hearing allows inclination of the spring receiving member.

5. An adjustment valve in which control of a valve opening degree is performed by a valve positioner including the air pressure control device according to claim 1.

* * * * *